United States Patent
Anschutz

(10) Patent No.: US 7,433,963 B2
(45) Date of Patent: Oct. 7, 2008

(54) METHODS, SYSTEMS, AND COMPUTER PROGRAM PRODUCTS FOR USING A TRANSLATION/INSTRUCTION SYSTEM TO REDIRECT A MULTIPROTOCOL LABEL SWITCHING (MPLS) PACKET

(75) Inventor: Thomas Arnold Anschutz, Conyers, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 924 days.

(21) Appl. No.: 10/747,736

(22) Filed: Dec. 29, 2003

(65) Prior Publication Data

US 2005/0165952 A1 Jul. 28, 2005

(51) Int. Cl.
*G06F 13/00* (2006.01)
(52) U.S. Cl. .................. 709/236; 709/238; 709/249
(58) Field of Classification Search ............. 709/230, 709/236, 238, 249
See application file for complete search history.

(56) References Cited

U.S. PATENT DOCUMENTS

| | | | | |
|---|---|---|---|---|
| 7,031,607 | B1* | 4/2006 | Aswood Smith | 398/51 |
| 7,082,140 | B1* | 7/2006 | Hass | 370/466 |
| 7,174,427 | B2* | 2/2007 | Ramia | 711/132 |
| 2003/0053414 | A1* | 3/2003 | Akahane et al. | 370/216 |
| 2003/0053464 | A1* | 3/2003 | Chen et al. | 370/400 |
| 2006/0013209 | A1* | 1/2006 | Somasundaram | 370/389 |

* cited by examiner

*Primary Examiner*—Viet Vu
(74) *Attorney, Agent, or Firm*—Myers Bigel Sibley & Sajovec, P.A.

(57) ABSTRACT

A multiprotocol label switching (MPLS) packet is processed by receiving an MPLS packet that has first header information including at least a first MPLS label at a first MPLS network node. A translation system is operated to obtain second header information that includes at least a second MPLS label. The MPLS packet is modified with the second header information. The MPLS packet is routed to a second MPLS network node based on the second header information.

54 Claims, 3 Drawing Sheets

US 7,433,963 B2

METHODS, SYSTEMS, AND COMPUTER PROGRAM PRODUCTS FOR USING A TRANSLATION/INSTRUCTION SYSTEM TO REDIRECT A MULTIPROTOCOL LABEL SWITCHING (MPLS) PACKET

FIELD OF THE INVENTION

The present invention relates to communication networks, and, more particularly, to multiprotocol label switching (MPLS) communication networks.

BACKGROUND OF THE INVENTION

Multiprotocol label switching (MPLS) provides a technique for routing packet data based on a label field rather than a destination address. An MPLS network comprises a set of nodes, which are called label switched routers (LSRs), that switch/route packets based on a label that has been added to each packet. Labels are used to define a flow of packets between two nodes or, if packets are being broadcast in a multicast operation, between a source node and multiple destination nodes. A specific path through the LSRs called a label switched path (LSP) is defined for each distinct flow, which is called a forwarding equivalence class (FEC). At intervening nodes in an LSP, an LSR may route the packet based on the MPLS label value, remove the MPLS label (pop a label), and/or impose an additional label (push a label). The label may be removed at the node from the packet at a node that is just prior to the destination node in a particular LSP. This process is sometimes referred to as "penultimate hop popping."

Referring now to FIG. 1, an exemplary MPLS label and Internet Protocol (IP) packet are illustrated. The MPLS label is a 32-bit header that includes a 20-bit label field, a 3-bit Exp field that is reserved for experimental use, a 1-bit S field that is set to one for the oldest entry in the stack and zero for all other entries, and an 8-bit time-to-live (TTL) field that may be used to encode a hop count or time-to-live value. An MPLS label may also be referred to as an MPLS shim header. As shown in FIG. 1, multiple MPLS labels or shim headers may be included in a single IP packet. The MPLS labels or shim headers are organized as a last-in, first-out stack and are processed based on the top MPLS label or shim header. As discussed above, an LSR may add an MPLS label or shim header to the stack (push operation) or remove an MPLS label or shim header from the stack (pop operation).

In IP networks, packets are routed according to their address. Routers typically do a pattern match of a packet's destination address with a set of known address ranges in a route table. The table entry tells the router which way to send the packet. Traditionally, IP addresses have a layer of indirection through the domain name system (DNS). A DNS is used to translate between domain names and IP addresses. Moreover, various algorithms have evolved to create relationships between domain names and IP addresses.

MPLS networks map IP address destinations to MPLS labels, which then determine the path and destination within the MPLS network that the IP packet will take. Unlike IP addresses, MPLS labels may not have global significance and an IP destination may be represented with different labels in different MPLS networks or even in different locations within the same MPLS network.

SUMMARY OF THE INVENTION

According to some embodiments of the present invention, a multiprotocol label switching (MPLS) packet is processed by receiving an MPLS packet that has first header information comprising at least a first MPLS label at a first MPLS network node. A translation system is operated to obtain second header information that comprises at least a second MPLS label. The MPLS packet is modified with the second header information. The MPLS packet is routed to a second MPLS network node based on the second header information.

In other embodiments of the present invention, the first and second MPLS network nodes are in the same MPLS network.

In still other embodiments of the present invention, the first and second MPLS network nodes are in different MPLS networks.

In still other embodiments of the present invention, the first MPLS network node is a destination for a plurality of MPLS labels.

In still other embodiments of the present invention, the translation system comprises a domain name system (DNS) and/or an address resolution protocol (ARP) database.

In further embodiments of the present invention, the first MPLS network node is associated with a first inter-exchange carrier (IEC) network and the second MPLS network node is associated with a second inter-exchange carrier (IEC) network.

In still further embodiments of the present invention, the first header information comprises a plurality of MPLS labels.

In still further embodiments of the present invention, the second header information comprises a plurality of MPLS labels.

In still further embodiments of the present invention, the first header information comprises layer two and/or three headers.

In still further embodiments of the present invention, the second header information comprises layer two and/or three headers.

In other embodiments of the present invention, modifying the MPLS packet with the second header information comprises replacing the first header information with the second header information.

In still other embodiments of the present invention, modifying the MPLS packet with the second header information comprises pushing the second header information on to the first header information.

In still other embodiments of the present invention, operating the translation system comprises evaluating at least one routing criterion and obtaining the second header information based on the evaluation of the at least one routing criterion.

In still other embodiments of the present invention, operating the translation system comprises operating the translation system to obtain the second header information responsive to the first header information.

In still other embodiments of the present invention, operating the translation system comprises operating the translation system to obtain the second header information and operating instructions for the first MPLS node.

In still other embodiments of the present invention, the translation system is external to the first and second MPLS network nodes.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
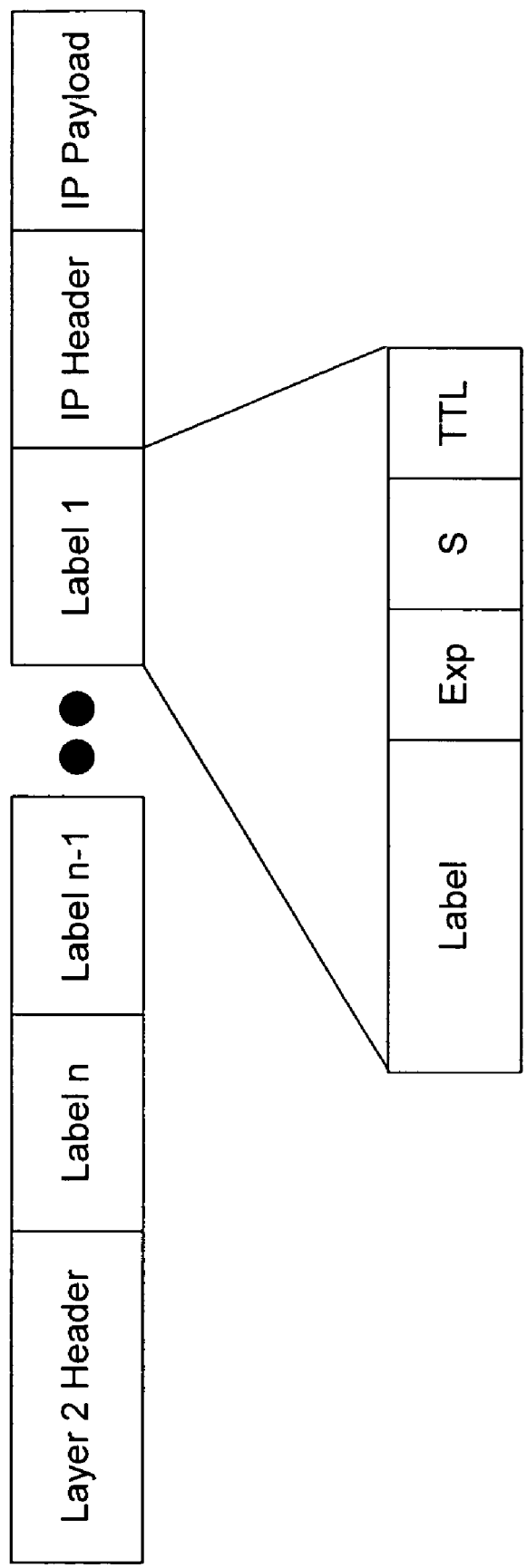
FIG. 1 is a block diagram that illustrates a conventional multiprotocol label switching (MPLS) label or shim header and internet protocol (IP) packet.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "protocol" refers to a defined set of rules that govern the exchange of data or information between two or more entities. In addition, a "protocol layer" refers to the hierarchical protocol structure represented by the open systems interconnection (OSI) model developed by the International Organization for Standardization in which layer one corresponds to the physical layer, layer two corresponds to the data link layer, layer three corresponds to the network layer, layer four corresponds to the transport layer, layer five corresponds to the session layer, layer six corresponds to the presentation layer, and layer seven corresponds to the application layer.

Figure 2:
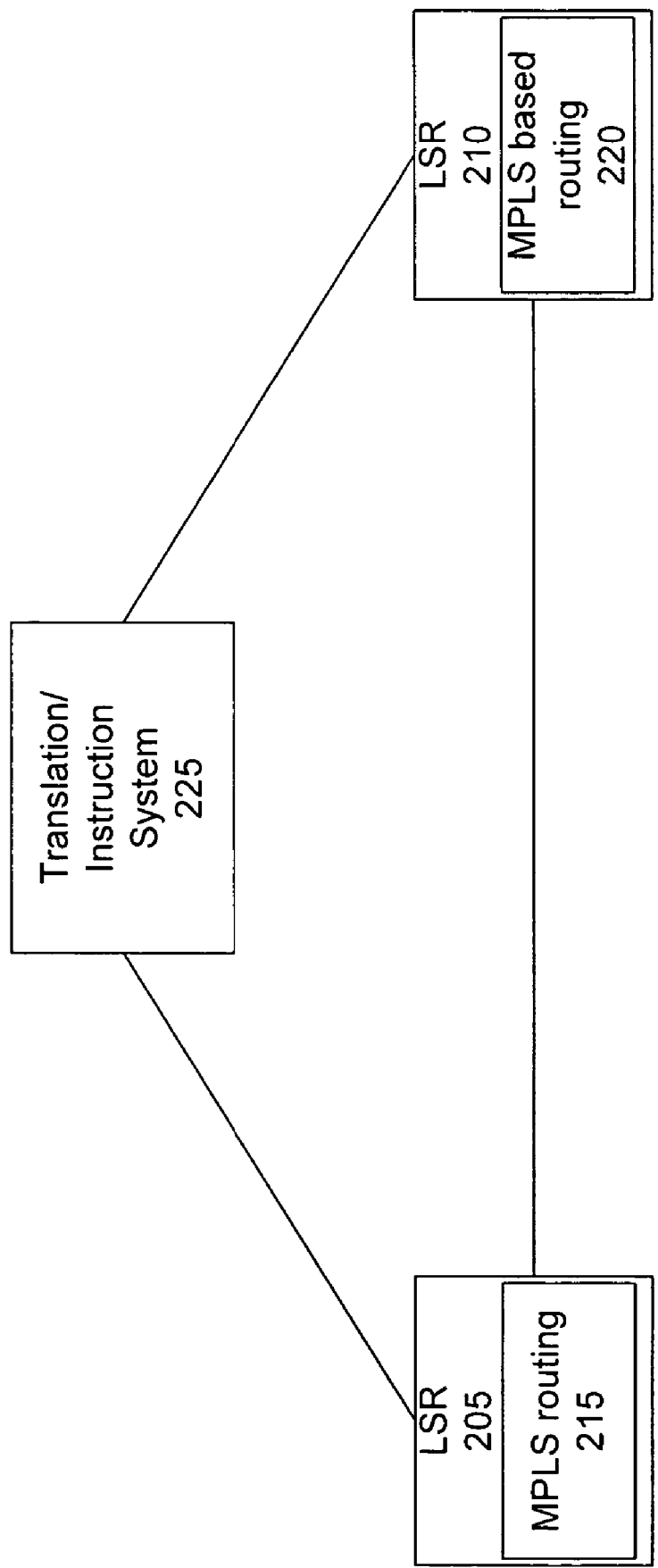
FIG. 2 is a block diagram that illustrates an MPLS network in accordance with some embodiments of the present invention.

Referring now to FIG. 2, two nodes or label switch routers (LSRs) 205 and 210 in a multiprotocol label switching (MPLS) network, in accordance with some embodiments of the present invention, are illustrated. As shown in FIG. 2, LSRs 205 and 210 comprise MPLS routing modules 215 and 220, respectively, which may be configured to establish a label switched path (LSP) between the LSRs 205 and 210. The two LSRs 205 and 210 may communicate with a translation/instruction system 225 in accordance with some embodiments of the present invention that facilitates redirection of an MPLS packet in a manner that may be analogous to the use of "800" phone numbers in telephony applications.

Although FIG. 2 illustrates an exemplary MPLS network, it will be understood that the present invention is not limited to such configurations, but is intended to encompass any configuration capable of carrying out the operations described herein. It will be appreciated that, in accordance with some embodiments of the present invention, the functionality of the MPLS routing modules 215 and 220 and the translation/instruction system 225 may be implemented using discrete hardware components, one or more application specific integrated circuits (ASICs), a programmed digital signal processor or microcontroller, a program stored in a memory and executed by a processor, and/or combinations thereof. In this regard, computer program code for carrying out operations of the MPLS routing modules 215 and 220 and the translation/instruction system 225 may be written in a high-level programming language, such as C or C++, for development convenience. In addition, computer program code for carrying out operations of the present invention may also be written in other programming languages, such as, but not limited to, interpreted languages. Some modules or routines may be written in assembly language or even microcode to enhance performance and/or memory usage.

The present invention is described hereinafter with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
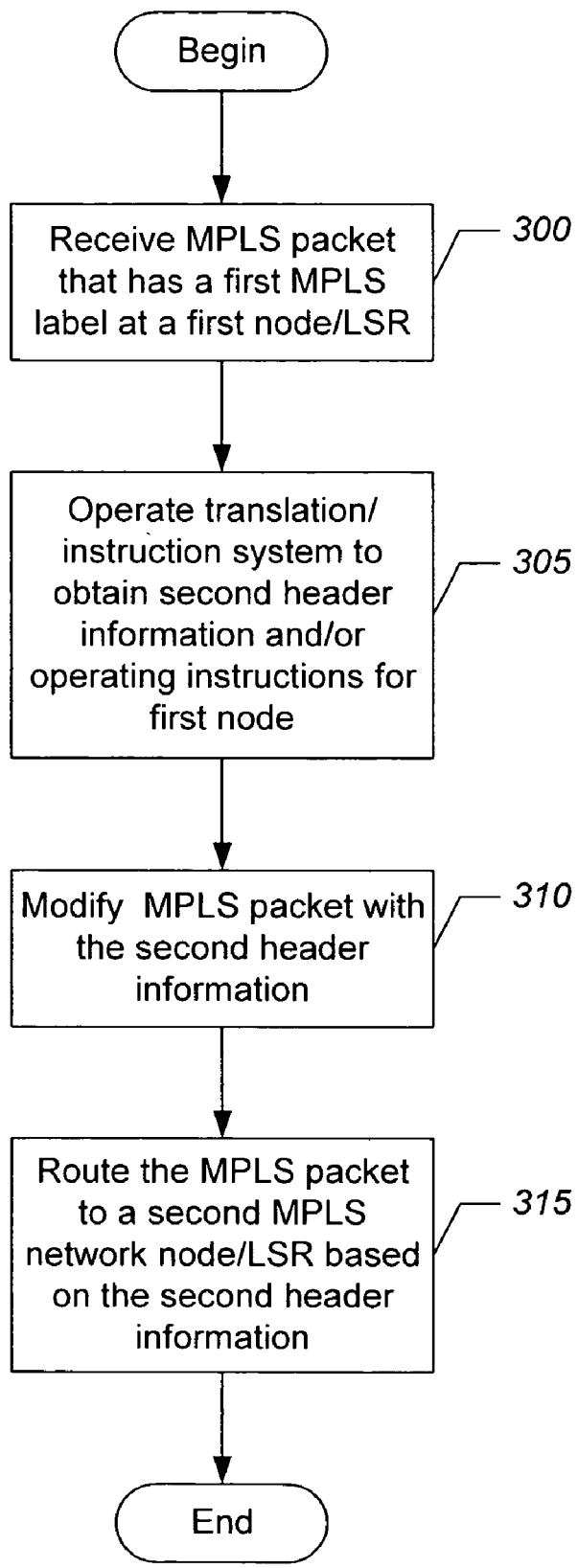
FIG. 3 is a flowchart that illustrates operations for using a translation/instruction system to redirect an MPLS packet in accordance with some embodiments of the present invention.

Operations for using a database to redirect an MPLS packet, in accordance with some embodiments of the present invention, will now be described with reference to FIGS. 3 and 2. Referring now to FIG. 3, operations begin at block 300 where an MPLS packet that has first header information that comprises at least a first MPLS label is received at a first node, such as LSR 205 of FIG. 2. The LSR 205 may communicate with the translation/instruction system 225, which is operable to obtain second header information that comprises at least a second MPLS label at block 305. The translation/instruction system 225 may generate the second header information in response to the first header information. In other embodiments, the translation/instruction system 225 may be operated to evaluate one or more routing criteria, such as, for example, the time of day, congestion on the network, or some other business parameter. The second header information may be generated based on the evaluation of the one or more routing criteria.

The MPLS packet may be modified with the second header information at block 310. In accordance with various embodiments of the present invention, the second header information may be used to replace the first header information in the MPLS packet or the second header information may be pushed on to the first header information on the MPLS packet. The LSR 205 may then route the MPLS packet to a second MPLS network node, such as LSR 210, based on the second header information. In this manner, the translation/instruction system 225 along with some optional business logic may be used to determine an indirect destination for a traffic flow. Moreover, a particular node or LSR may function as a network indirection point in an MPLS network. In particular embodiments of the present invention, the second header information may be applied to subsequent packets that bear at least a portion of the first header information for a number of packets, seconds, bytes, or some other defined event.

In accordance with various embodiments of the present invention, LSRs 205 and 210 may be in the same MPLS network or in different MPLS networks. Embodiments of the present invention may be used to route traffic between separate MPLS networks that do not share a common MPLS label space. For example, LSR 205 may be associated with a first inter-exchange carrier (IEC) network and LSR 210 may be associated with a second IEC network.

As discussed above, use of the translation/instruction system 225 to redirect MPLS packets may be analogous to "800" service in telephony. In this regard, an LSR, such as LSR 205, may be configured as the destination for a plurality of MPLS labels. These labels may then map to one or more other labels that are used to redirect these packets to another destination.

In other embodiments of the present invention, the first header information may comprise a plurality of MPLS labels and/or the second header information may comprise a plurality of MPLS labels. In this way, the packet may be forwarded to traverse a more complex path through one or more MPLS networks. In still other embodiments of the present invention, the first header information may comprise a layer two and/or layer three protocol header and the second header information may comprise a layer two and/or layer three protocol header.

The translation/instruction system 225 may be configured in various ways in accordance with various embodiments of the present invention. In some embodiments, the translation/instruction system 225 comprises a domain name system (DNS) and/or an address resolution protocol (ARP) database in addition to the MPLS label translation functionality. The DNS system is used to translate between domain names and IP addresses and the ARP system is used to map an IP address to a physical machine address. In other embodiments, the translation/instruction system 225 may be operated to generate operating instructions for the first MPLS node. The first MPLS node may be operated in accordance with these instructions/directives to, for example, mirror packets to a monitoring port, log packet and/or flow information, change the quality of service associated with the traffic, and/or perform some other function.

The flowchart of FIG. 3 illustrates the architecture, functionality, and operations of some embodiments of methods, systems, and computer program products for using a translation/instruction system to redirect an MPLS packet flow. In this regard, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

Many variations and modifications can be made to the embodiments described herein without substantially departing from the principles of the present invention. All such variations and modifications are intended to be included herein within the scope of the present invention, as set forth in the following claims.

That which is claimed:

1. A method of processing a multiprotocol label switching (MPLS) packet, comprising:
  receiving an MPLS packet having first header information comprising at least a first MPLS label at a first MPLS network node;
  operating a translation system to obtain second header information comprising at least a second MPLS label, the translation system being independent of MPLS lookup tables used to define label switched paths;
  modifying the MPLS packet with the second header information; and
  routing the MPLS packet to a second MPLS network node based on the second header information;
  wherein operating the translation system comprises:
  evaluating at least one routing criterion; and
  obtaining the second header information based on the evaluation of the at least one routing criterion.

2. The method of claim 1, wherein the first and second MPLS network nodes are in the same MPLS network.

3. The method of claim 1, wherein the first and second MPLS network nodes are in different MPLS networks.

4. The method of claim 1, wherein the first MPLS network node is a destination for a plurality of MPLS labels.

5. The method of claim 1, wherein the translation system comprises a domain name system (DNS) and/or an address resolution protocol (ARP) database.

6. The method of claim 1, wherein the first MPLS network node is associated with a first inter-exchange carrier (IEC)

network and the second MPLS network node is associated with a second inter-exchange carrier (IEC) network.

7. The method of claim 1, wherein the first header information comprises a plurality of MPLS labels.

8. The method of claim 1, wherein the first header information comprises a layer two and/or layer three header.

9. The method of claim 1, wherein the second header information comprises a plurality of MPLS labels.

10. The method of claim 1, wherein the second header information comprises a layer two and/or layer three header.

11. The method of claim 1, wherein the first header information comprises a layer two and/or a layer three header.

12. The method of claim 1, wherein the second header information comprises a layer two and/or a layer three header.

13. The method of claim 1, wherein modifying the MPLS packet with the second header information comprises replacing the first header information with the second header information.

14. The method of claim 1, wherein modifying the MPLS packet with the second header information comprises pushing the second header information on to the first header information.

15. The method of claim 1, wherein operating the translation system comprises operating the translation system to obtain second header information comprising at least the second MPLS label responsive to the first header information.

16. The method of claim 1, wherein operating the translation system comprises operating the translation system to obtain second header information comprising at least the second MPLS label and operating instructions for the first MPLS node, the method further comprising:
  operating the first MPLS node based on the operating instructions.

17. The method of claim 1, wherein the translation system is external to the first and second MPLS network nodes.

18. The method of claim 1, further comprising:
  determining if a subsequent MPLS packet contains at least a portion of the first header information;
  modifying the subsequent MPLS packet with the second header information; and
  routing the subsequent MPLS packet to the second MPLS network node based on the second header information.

19. A system for processing a multiprotocol label switching (MPLS) packet, comprising:
  means for receiving an MPLS packet having first header information comprising at least a first MPLS label at a first MPLS network node;
  means for operating a translation system to obtain second header information comprising at least a second MPLS label, the translation system being independent of MPLS lookup tables used to define label switched paths;
  means for modifying the MPLS packet with the second header information; and
  means for routing the MPLS packet to a second MPLS network node based on the second header information;
  wherein the means for operating the translation system comprises:
  means for evaluating at least one routing criterion; and
  means for obtaining the second header information based on the evaluation of the at least one routing criterion.

20. The system of claim 19, wherein the first and second MPLS network nodes are in the same MPLS network.

21. The system of claim 19, wherein the first and second MPLS network nodes are in different MPLS networks.

22. The system of claim 19, wherein the first MPLS network node is a destination for a plurality of MPLS labels.

23. The system of claim 19, wherein the translation system comprises a domain name system (DNS) and/or an address resolution protocol (ARP) database.

24. The system of claim 19, wherein the first MPLS network node is associated with a first inter-exchange carrier (IEC) network and the second MPLS network node is associated with a second inter-exchange carrier (IEC) network.

25. The system of claim 19, wherein the first header information comprises a plurality of MPLS labels.

26. The system of claim 19, wherein the first header information comprises a layer two and/or layer three header.

27. The system of claim 19, wherein the second header information comprises a plurality of MPLS labels.

28. The system of claim 19, wherein the second header information comprises a layer two and/or layer three header.

29. The system of claim 19, wherein the first header information comprises a layer two and/or a layer three header.

30. The system of claim 19, wherein the second header information comprises a layer two and/or a layer three header.

31. The system of claim 19, wherein the means for modifying the MPLS packet with the second header information comprises means for replacing the first header information with the second header information.

32. The system of claim 19, wherein the means for modifying the MPLS packet with the second header information comprises means for pushing the second header information on to the first header information.

33. The system of claim 19, wherein the means for operating the translation system comprises means for operating the translation system to obtain second header information comprising at least the second MPLS label responsive to the first header information.

34. The system of claim 19, wherein the means for operating the translation system comprises means for operating the translation system to obtain second header information comprising at least the second MPLS label and operating instructions for the first MPLS node, the system further comprising:
  means for operating the first MPLS node based on the operating instructions.

35. The system of claim 19, wherein the translation system is external to the first and second MPLS network nodes.

36. The system of claim 19, further comprising:
  means for determining if a subsequent MPLS packet contains at least a portion of the first header information;
  means for modifying the subsequent MPLS packet with the second header information; and
  means for routing the subsequent MPLS packet to the second MPLS network node based on the second header information.

37. A computer program product for processing a multiprotocol label switching (MPLS) packet, comprising:
  a computer readable storage medium having computer readable program code embodied therein, the computer readable program code comprising:
  computer readable program code configured to receive an MPLS packet having first header information comprising at least a first MPLS label at a first MPLS network node;
  computer readable program code configured to operate a translation system to obtain second header information comprising at least a second MPLS label, the translation system being independent of MPLS lookup tables used to define label switched paths;
  computer readable program code configured to modify the MPLS packet with the second header information; and computer readable program code configured to route the MPLS packet to a second MPLS network node based on the second header information;

wherein the computer readable program code configured to operate the translation system comprises:

computer readable program code configured to evaluate at least one routing criterion; and computer readable program code configured to obtain the second header information based on the evaluation of the at least one routing criterion.

38. The computer program product of claim 37, wherein the first and second MPLS network nodes are in the same MPLS network.

39. The computer program product of claim 37, wherein the first and second MPLS network nodes are in different MPLS networks.

40. The computer program product of claim 37, wherein the first MPLS network node is a destination for a plurality of MPLS labels.

41. The computer program product of claim 37, wherein the translation system comprises a domain name system (DNS) and/or an address resolution protocol (ARP) database.

42. The computer program product of claim 37, wherein the first MPLS network node is associated with a first inter-exchange carrier (IEC) network and the second MPLS network node is associated with a second inter-exchange carrier (IEC) network.

43. The computer program product of claim 37, wherein the first header information comprises a plurality of MPLS labels.

44. The computer program product of claim 37, wherein the first header information comprises a layer two and/or layer three header.

45. The computer program product of claim 37, wherein the second header information comprises a plurality of MPLS labels.

46. The computer program product of claim 37, wherein the second header information comprises a layer two and/or layer three header.

47. The computer program product of claim 37, wherein the first header information comprises a layer two and/or a layer three header.

48. The computer program product of claim 37, wherein the second header information comprises a layer two and/or a layer three header.

49. The computer program product of claim 37, wherein the computer readable program code configured to modify the MPLS packet with the second header information comprises computer readable program code configured to replace the first header information with the second header information.

50. The computer program product of claim 37, wherein the computer readable program code configured to modify the MPLS packet with the second header information comprises computer readable program code configured to push the second header information on to the first header information.

51. The computer program product of claim 37, wherein the computer readable program code configured to operate the translation system comprises computer readable program code configured to operate the translation system to obtain second header information comprising at least the second MPLS label responsive to the first header information.

52. The computer program product of claim 37, wherein the computer readable program code configured to operate the translation system comprises computer readable program code configured to operate the translation system to obtain second header information comprising at least the second MPLS label and operating instructions for the first MPLS node, the computer program product further comprising:

computer readable program code configured to operate the first MPLS node based on the operating instructions.

53. The computer program product of claim 37, wherein the translation system is external to the first and second MPLS network nodes.

54. The computer program product of claim 37, further comprising:

computer readable program code configured to determine if a subsequent MPLS packet contains at least a portion of the first header information;

computer readable program code configured to modify the subsequent MPLS packet with the second header information; and computer readable program code configured to route the subsequent MPLS packet to the second MPLS network node based on the second header information.

* * * * *